(12) United States Patent
Morenko

(10) Patent No.: US 10,955,140 B2
(45) Date of Patent: *Mar. 23, 2021

(54) COMBUSTOR FOR GAS TURBINE ENGINE

(71) Applicant: PRATT & WHITNEY CANADA CORP., Longueuil (CA)

(72) Inventor: Oleg Morenko, Oakville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 305 days.

This patent is subject to a terminal disclaimer.

(21) Appl. No.: 15/363,418

(22) Filed: Nov. 29, 2016

(65) Prior Publication Data

US 2017/0074517 A1 Mar. 16, 2017

Related U.S. Application Data

(63) Continuation of application No. 13/795,058, filed on Mar. 12, 2013, now Pat. No. 9,541,292.

(51) Int. Cl.
| | |
|---|---|
| *F23R 3/28* | (2006.01) |
| *F02C 7/22* | (2006.01) |
| *F23R 3/00* | (2006.01) |
| *F23R 3/10* | (2006.01) |
| *F23R 3/50* | (2006.01) |
| *F23R 3/54* | (2006.01) |

(52) U.S. Cl.
CPC ............... *F23R 3/28* (2013.01); *F02C 7/222* (2013.01); *F23R 3/002* (2013.01); *F23R 3/10* (2013.01); *F23R 3/283* (2013.01); *F23R 3/50* (2013.01); *F05D 2220/32* (2013.01); *F05D 2240/35* (2013.01); *F05D 2250/36* (2013.01); *F23R 3/54* (2013.01)

(58) Field of Classification Search
CPC .. F23R 3/283; F23R 3/286; F23R 3/50; F23R 3/54; F23R 2900/00017; F02C 7/222
See application file for complete search history.

(56) References Cited

U.S. PATENT DOCUMENTS

| | | |
|---|---|---|
| 2,718,757 A | 9/1955 | Bloomer |
| 3,134,229 A | 5/1964 | Johnson |
| 3,213,523 A | 10/1965 | Boehler |
| 3,653,207 A | 4/1972 | Stenger et al. |
| 3,938,323 A | 2/1976 | Quigg |
| 4,058,977 A | 11/1977 | Markowski et al. |
| 4,150,539 A | 4/1979 | Rubins et al. |
| 4,192,139 A | 3/1980 | Buchheim |

(Continued)

FOREIGN PATENT DOCUMENTS

| | | |
|---|---|---|
| EP | 1705426 A1 | 9/2006 |
| EP | 1775516 A2 | 4/2007 |

(Continued)

*Primary Examiner* — Gerald L Sung
*Assistant Examiner* — Rene D Ford
(74) *Attorney, Agent, or Firm* — Norton Rose Fulbright Canada LLP

(57) ABSTRACT

A gas turbine engine comprises a combustor. The combustor comprises an annular combustor chamber formed between an inner liner and an outer liner spaced apart from the inner liner. An annular fuel manifold has fuel nozzles distributed circumferentially on the fuel manifold, the fuel manifold and fuel nozzles positioned entirely inside the combustion chamber.

18 Claims, 4 Drawing Sheets

(56) References Cited

U.S. PATENT DOCUMENTS

| | | | |
|---|---|---|---|
| 4,253,301 A | 3/1981 | Vogt | |
| 4,260,367 A | 4/1981 | Markowski | |
| 4,265,615 A | 5/1981 | Lohmann | |
| 4,292,801 A | 10/1981 | Wilkes et al. | |
| 4,301,657 A | 11/1981 | Penny | |
| 4,420,929 A | 12/1983 | Jorgensen et al. | |
| 4,498,288 A | 2/1985 | Vogt | |
| 4,499,735 A | 2/1985 | Moore | |
| 4,603,548 A | 8/1986 | Ishibashi et al. | |
| 4,898,001 A | 2/1990 | Kuroda et al. | |
| 4,984,429 A | 1/1991 | Waslo | |
| 4,996,838 A | 3/1991 | Melconian | |
| 5,025,622 A | 6/1991 | Melconian | |
| 5,109,671 A | 5/1992 | Haasis | |
| 5,127,229 A | 7/1992 | Ishibashi et al. | |
| 5,168,699 A | 12/1992 | McCarty et al. | |
| 5,231,833 A | 8/1993 | MacLean et al. | |
| 5,237,813 A | 8/1993 | Harris | |
| 5,323,602 A | 6/1994 | Defever | |
| 5,475,979 A | 12/1995 | Oag et al. | |
| 5,579,645 A | 12/1996 | Prociw et al. | |
| 5,592,819 A | 1/1997 | Ansart | |
| 5,599,735 A | 2/1997 | Moslehi | |
| 5,653,109 A | 8/1997 | Overton et al. | |
| 5,771,696 A | 6/1998 | Hansel et al. | |
| 5,791,148 A * | 8/1998 | Burrus | F01D 5/18 60/749 |
| 5,816,050 A | 10/1998 | Sjunnesson | |
| 5,934,067 A | 8/1999 | Ansart et al. | |
| 5,937,653 A | 8/1999 | Alary et al. | |
| 6,070,410 A | 6/2000 | Dean | |
| 6,209,325 B1 | 4/2001 | Alkabie | |
| 6,253,538 B1 | 7/2001 | Sampath et al. | |
| 6,508,061 B2 | 1/2003 | Stuttaford | |
| 6,543,231 B2 | 4/2003 | Stuttaford et al. | |
| 6,810,673 B2 | 11/2004 | Snyder | |
| 6,955,053 B1 | 10/2005 | Chen et al. | |
| 7,448,218 B2 | 11/2008 | Heilos et al. | |
| 7,509,809 B2 | 3/2009 | Patel et al. | |
| 7,748,221 B2 | 7/2010 | Patel et al. | |
| 7,942,006 B2 | 5/2011 | Critchley et al. | |
| 8,051,664 B2 | 11/2011 | Fish | |
| 8,091,367 B2 | 1/2012 | Alkabie | |
| 8,113,001 B2 | 2/2012 | Singh et al. | |
| 8,307,661 B2 | 11/2012 | Harris et al. | |
| 9,127,843 B2 | 9/2015 | Prociw | |
| 2002/0157401 A1 | 10/2002 | Stuttaford | |
| 2003/0074885 A1 | 4/2003 | Rokke | |
| 2003/0177769 A1 | 9/2003 | Graves | |
| 2003/0213249 A1 | 11/2003 | Pacheco-Tougas | |
| 2005/0076650 A1 | 4/2005 | Dudebout et al. | |
| 2006/0042263 A1 | 3/2006 | Patel et al. | |
| 2006/0042271 A1 | 3/2006 | Morenko et al. | |
| 2006/0196188 A1 | 9/2006 | Burd | |
| 2006/0218925 A1 | 10/2006 | Prociw | |
| 2007/0028620 A1 | 2/2007 | McMasters et al. | |
| 2007/0125093 A1 | 6/2007 | Burd | |
| 2007/0130953 A1 | 6/2007 | Burd | |
| 2007/0169484 A1 | 7/2007 | Schumacher | |
| 2007/0227149 A1 | 10/2007 | Biebel | |
| 2007/0227150 A1 | 10/2007 | Alkabie | |
| 2007/0271925 A1 | 11/2007 | Alkabie | |
| 2007/0271926 A1 | 11/2007 | Alkabie | |
| 2008/0104962 A1 | 5/2008 | Patel | |
| 2008/0105237 A1 | 5/2008 | Gandza | |
| 2009/0071161 A1 | 3/2009 | Critchley | |
| 2009/0113893 A1 | 5/2009 | Li et al. | |
| 2010/0212325 A1 | 8/2010 | Condevaux et al. | |
| 2010/0281881 A1 | 11/2010 | Morenko | |
| 2011/0185699 A1 | 8/2011 | Danis et al. | |
| 2011/0239652 A1 | 10/2011 | McMahan et al. | |
| 2012/0125004 A1 | 5/2012 | Parsania et al. | |
| 2012/0234013 A1 | 9/2012 | Overman | |
| 2012/0240588 A1 | 9/2012 | Patel et al. | |
| 2014/0190178 A1 | 7/2014 | O'Donnell | |
| 2014/0238024 A1 | 8/2014 | Kraemer | |
| 2014/0260266 A1 | 9/2014 | Prociw et al. | |
| 2014/0260297 A1 | 9/2014 | Prociw et al. | |
| 2014/0260298 A1 | 9/2014 | Prociw et al. | |
| 2015/0247641 A1 | 9/2015 | Patel et al. | |

FOREIGN PATENT DOCUMENTS

| | | |
|---|---|---|
| FR | 1165074 A | 10/1958 |
| FR | 2694799 A1 | 2/1994 |
| GB | 686425 A | 9/1950 |
| WO | 2013023147 A1 | 2/2013 |

* cited by examiner

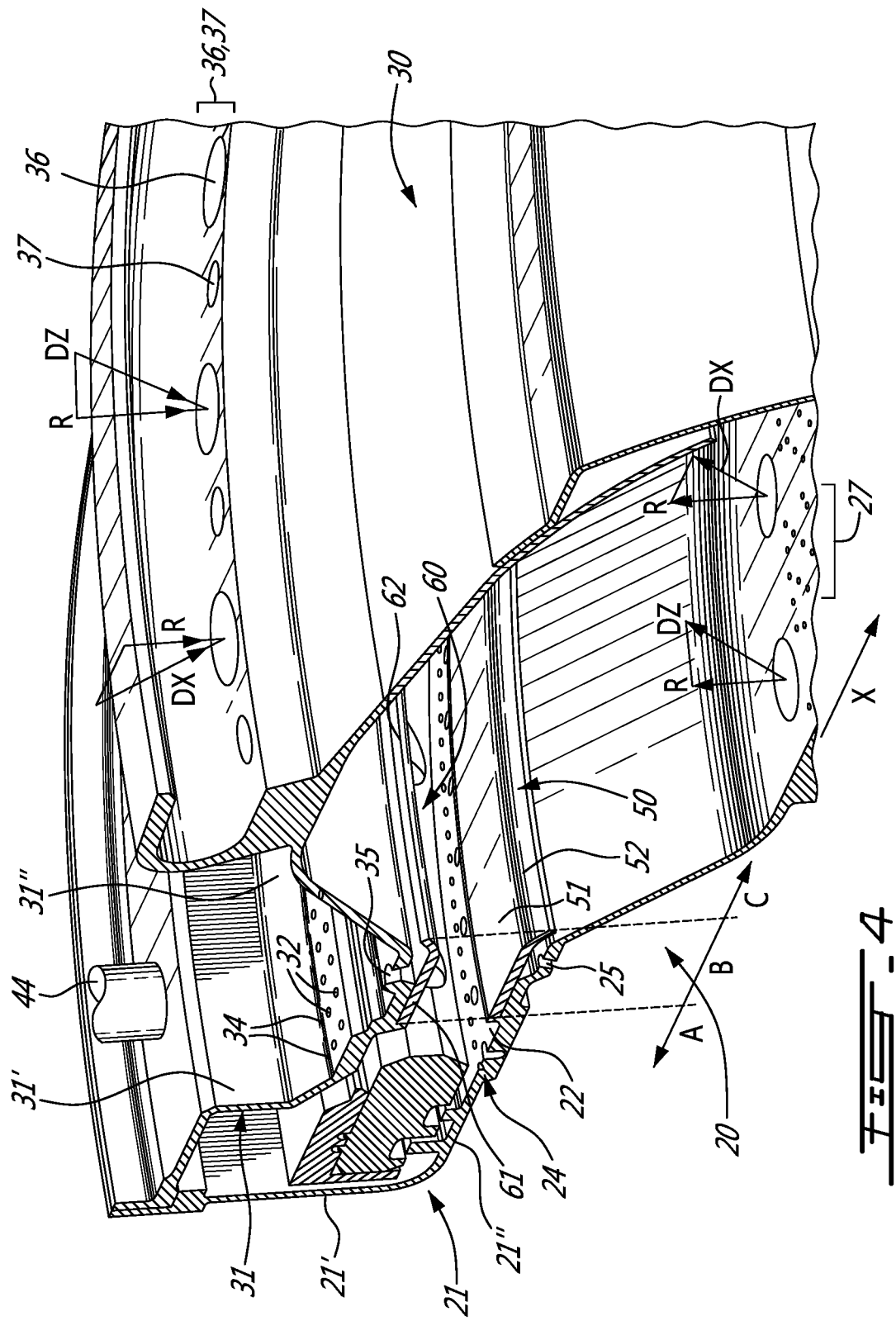

COMBUSTOR FOR GAS TURBINE ENGINE

CROSS-REFERENCE TO RELATED APPLICATION

This is a continuation non-provisional application of Ser. No. 13/795,058 filed on Mar. 12, 2013, the subject matter of which is incorporated herein by reference in its entirety.

FIELD OF THE INVENTION

The present application relates to gas turbine engines and to a combustor thereof.

BACKGROUND OF THE ART

An internal manifold mounting arrangement may have several radial pins that locate the manifold inside the gas generator case. Heat shielding may be required to prevent fuel coking inside the manifold. Depending on the nature of the manifold design, it may be hard to achieve complete heat-shielding of the enclosure. A further risk is that, if a manifold is not fully enclosed, fuel leakage may occur in case of manifold sealing failure. Also, relative thermal growth of manifold and combustor leads to axial displacement between the fuel nozzle tip and combustor primary zone which may affect combustion characteristics. Room for improvement exists.

SUMMARY

In accordance with an embodiment of the present disclosure, there is provided a combustor comprising: an annular combustor chamber formed between an inner liner and an outer liner spaced apart from the inner liner; and an annular fuel manifold having fuel nozzles distributed circumferentially on the fuel manifold, the fuel manifold and fuel nozzles positioned entirely inside the combustion chamber.

In accordance with another embodiment of the present disclosure, there is provided a gas turbine engine comprising a combustor, the combustor comprising: an annular combustor chamber formed between an inner liner and an outer liner spaced apart from the inner liner; and an annular fuel manifold having fuel nozzles distributed circumferentially on the fuel manifold, the fuel manifold and fuel nozzles positioned entirely inside the combustion chamber.

DESCRIPTION OF THE DRAWINGS

FIG. 4 is another sectional perspective view of the combustor assembly of FIG. 2.

DESCRIPTION OF THE EMBODIMENT

Figure 1:
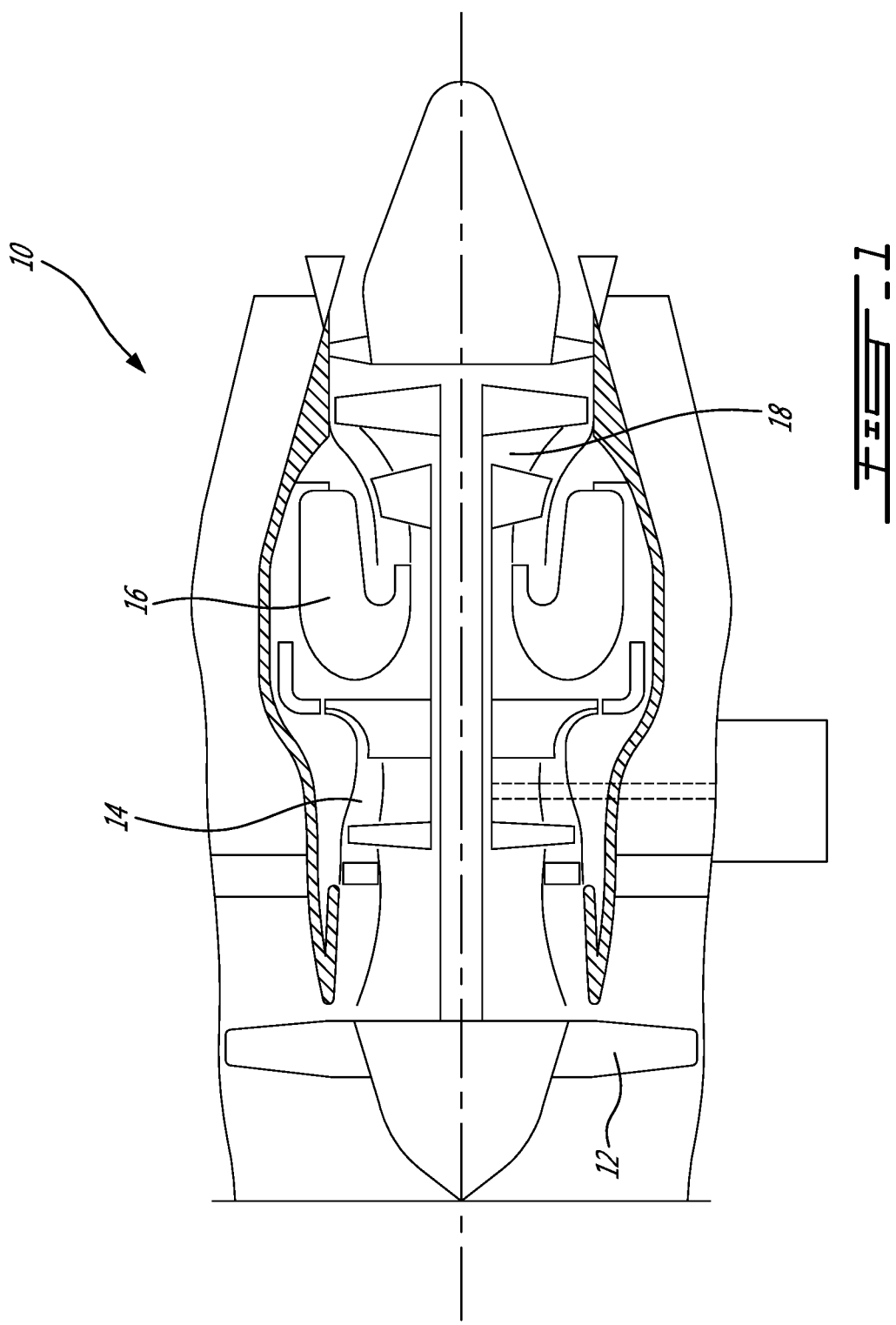
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air within a compressor case 15, a combustor 16 in which the compressed air is mixed with fuel and ignited for generating an annular stream of hot combustion gases, and a turbine section 18 for extracting energy from the combustion gases.

Figure 2:
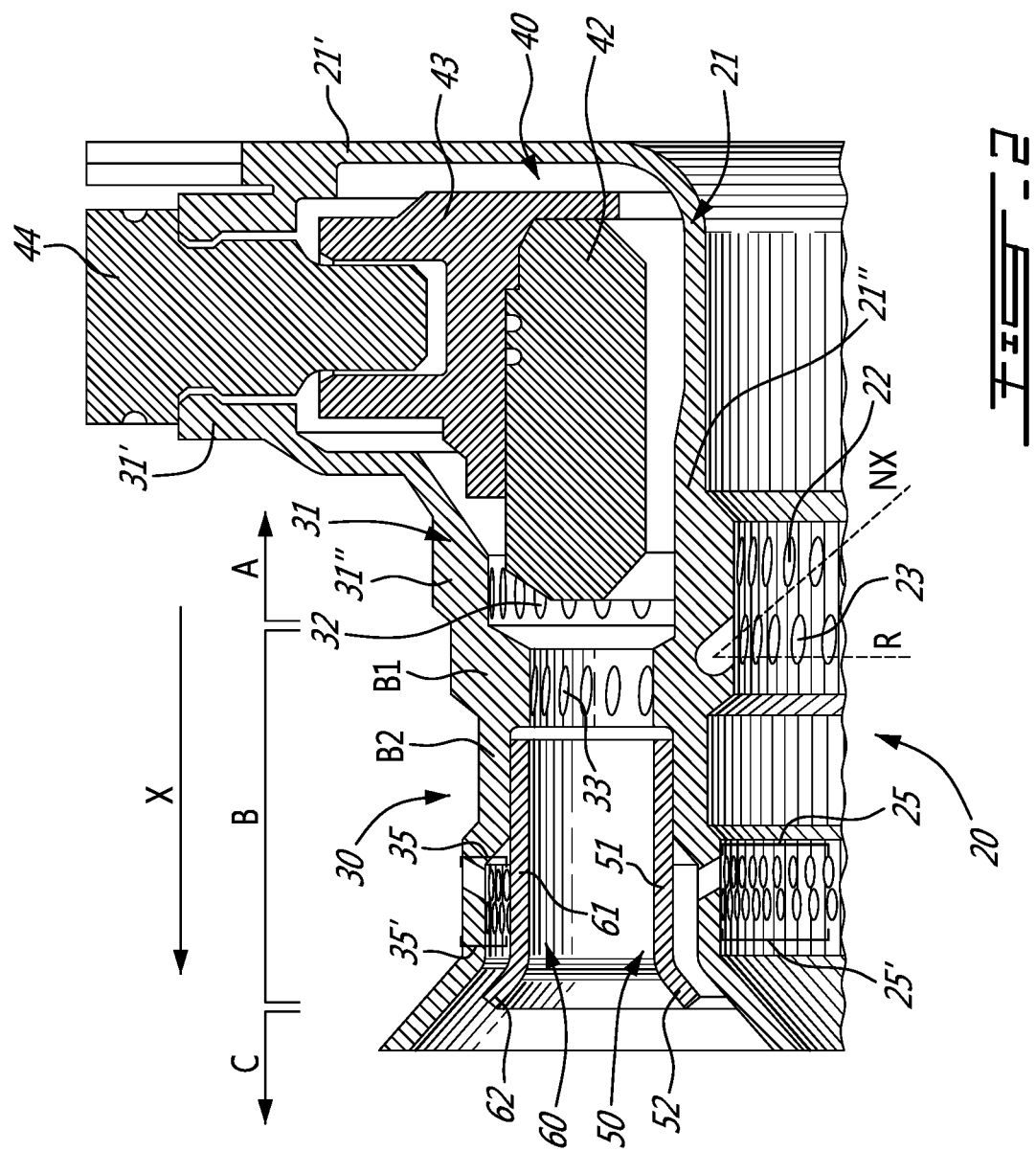
FIG. 2 is a longitudinal sectional view of a combustor assembly in accordance with the present disclosure.
Figure 3:
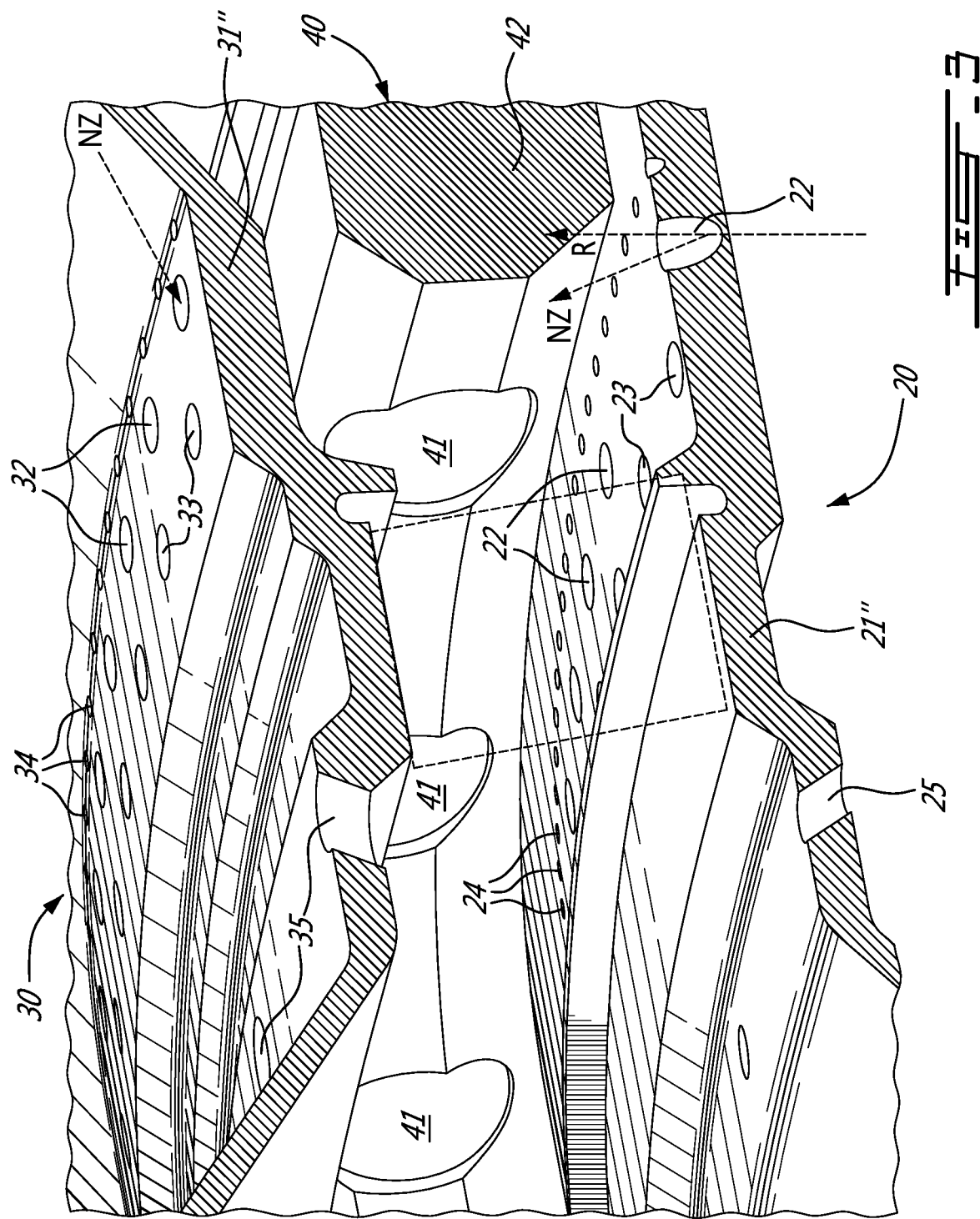
FIG. 3 is a sectional perspective view of the combustor assembly of FIG. 2.

The combustor 16 is illustrated in FIG. 1 as being of the reverse-flow type, however the skilled reader will appreciate that the description herein may be applied to many combustor types, such as straight-flow combustors, radial combustors, lean combustors, and other suitable annular combustor configurations. The combustor 16 has an annual geometry with an inner liner 20 and an outer liner 30 defining therebetween an annular combustor chamber in which fuel and air mix and combustion occurs. As shown in FIGS. 2 and 3, a fuel manifold 40 is positioned inside the combustion chamber and therefore between the inner liner 20 and the outer liner 30.

In the illustrated embodiment, an upstream end of the combustor 16 has a sequence of zones, namely zones A, B, and C. The manifold 40 is in upstream zone A. A narrowing portion B1 is defined in mixing zone B. A shoulder B2 is defined in mixing zone B to support components involved in the mixing of the fuel and air, such as a louver, as described hereinafter. In dilution zone C, the combustor 16 flares to allow wall cooling and dilution air to mix with the fuel and nozzle air mixture coming from the zones B and C of the combustor 16. A combustion zone is downstream of the dilution zone C.

The inner liner 20 and the outer liner 30 respectively have support walls 21 and 31 by which the manifold 40 is supported to be held in position inside the combustor 16. Hence, the support walls 21 and 31 may have outward radial wall portions 21' and 31', respectively, supporting components of the manifold 40, and turning into respective axial wall portions 21" and 31" towards zone B. Nozzle air inlets 22 and 32 are circumferentially distributed in the inner liner 20 and outer liner 30, respectively. According to an embodiment, the nozzle air inlets 22 and nozzle air inlets 32 are equidistantly distributed. The nozzle air inlets 22 and nozzle air inlets 32 are opposite one another across combustor chamber. It is observed that the central axis of one or more of the nozzle air inlets 22 and 32 may have an axial component and/or a tangential component, as opposed to being strictly radial. Referring to FIG. 2, it is observed that the central axis is oblique relative to a radial axis R of the combustor 16, in a plane in which lies a longitudinal axis X of the combustor 16. Hence, the axial component NX of the central axis is oriented downstream, i.e., in the same direction as that of the flow of the fuel and air, whereby the central axis leans towards a direction of flow (for instance generally parallel to the longitudinal axis X). In an embodiment, the central axis could lean against a direction of the flow.

Referring to FIGS. 3 and 4, the central axis of one or more of the nozzle air inlets 22 and 32 may have a tangential component NZ, in addition or in alternative to the axial component NX. For simplicity, in FIGS. 3 and 4, only the tangential component NZ of the central axis is shown, although the nozzle air inlets 22 and 32 may have both an axial and a tangential component. The tangential component NZ is oblique relative to radial axis R in an axial plane, i.e., the axial plane being defined as having the longitudinal axis X of the combustor 16 being normal to the axial plane. In FIG. 3, the tangential component NZ is in a counterclockwise direction, while in FIG. 4, the tangential component NZ is clockwise. The tangential component NZ may allow an increase residence time of the air and fuel mixture in the downstream mixing zone B of the combustor 16.

Referring to FIG. 2, nozzle air inlets 23 and 33 may be located in the narrowing portion B1 of mixing zone B. Alternatively, as shown in FIG. 3, the nozzle air inlets 23 and 33 may be in the upstream zone A. The nozzle air inlets 23 and 33 may form a second circumferential distribution of inlets, if the combustor 16 has two circumferential distributions of inlets (unlike FIG. 4, showing a single circumferential distribution). In similar fashion to the set of inlets 22/32, the inlets 23 and 33 are respectively in the inner liner 20 and outer liner 30. The inlets 23 and 33 may be oriented such that their central axes X may have an axial component and/or a tangential component.

Hence, the combustor 16 comprises numerous nozzle air inlets (e.g., 22, 23, 32, 33) impinging onto the fuel sprays produced by the fuel manifold 40, in close proximity to the fuel nozzles, thereby encouraging rapid mixing of air and fuel. The orientation of the nozzle air inlets relative to the fuel nozzles (not shown) may create the necessary shearing forces between air jets and fuel stream, to encourage secondary fuel droplets breakup, and assist in rapid fuel mixing and vaporization.

Purged air inlets 24 and 34 may be respectively defined in the inner liner 20 and the outer liner 30, and be positioned in the upstream zone A of the combustor 16. In similar fashion to the sets of nozzle air inlets 22/32, a central axis of the purged air inlets 24 and 34 may lean toward a direction of flow with an axial component similar to axial component NX, as shown in FIG. 2. Purged air inlets 24 and 34 produce a flow of air on the downstream surface of the manifold 40. As shown in FIGS. 2, 3 and 4, sets of cooling air inlets 25 and 35, and cooling air inlets 25' and 35', respectively in the inner liner 20 and the outer liner 30, may be circumferentially distributed in the mixing zone B downstream of the sets of nozzle air inlets 23 and 33. The cooling air inlets 25, 25', 35, 35' may be in channels defined by the liners 20 and 30 and mixing walls 50 and 60 (described hereinafter). Cooling air inlets 25, 25', 35 and 35' may produce a flow of air on flaring wall portions of the inner liner 20 and outer liner 30.

Referring to FIG. 4, dilution air inlets 26 and 36 are circumferentially distributed in the dilution zone C of the combustor 16, respectively in the inner liner 20 and outer liner 30. According to an embodiment, the dilution air inlets 26 and 36 are equidistantly distributed, and opposite one another across combustor chamber. It is observed that the central axis of one or more of the dilution air inlets 26 and 36, generally shown as D, may have an axial component and/or a tangential component, as opposed to being strictly radial. Referring to FIG. 4, the central axis D is oblique relative to a radial axis R of the combustor 16, in a plane in which lies a longitudinal axis X of the combustor 16. Hence, the axial component DX of the central axis D is oriented downstream, i.e., in the same direction as that of the flow of the fuel and air, whereby the central axis D leans towards a direction of flow (for instance generally parallel to the longitudinal axis X). In an embodiment, the central axis D could lean against a direction of the flow.

Still referring to FIG. 4, the central axis D of one or more of the dilution air inlets 26 and 36 may have a tangential component DZ, in addition or in alternative to the axial component DX. For simplicity, in FIG. 4, one inlet is shown with only the axial component DX, while another is shown with only the tangential component DZ. It should however be understood that the inlets 26 and 36 may have both the axial component DX and the tangential component DZ. The tangential component DZ is oblique relative to radial axis R in an axial plane, i.e., the axial plane being defined as having the longitudinal axis X of the combustor 16 being normal to the axial plane. In FIG. 4, the tangential component DZ is in a counterclockwise direction. It is thus observed that the tangential component DZ of the central axes D may be in an opposite direction than that of the tangential component NZ of the central axes N of the nozzle air inlets 22, 23, 32, and/or 33, shown as being clockwise. The opposite direction of tangential components DZ and NZ may enhance fluid mixing to render the fuel and air mixture more uniform, which may lead to keeping the flame temperature relatively low (and related effects, such as lower NOx and smoke emissions, low pattern factor, and enhanced hot-section durability). The opposite tangential direction of dilution air holes relative to the nozzle air holes cause the creation of a recirculation volume immediately upstream of the penetrating dilution jets, further enhancing fuel-air mixing before burning, in a relatively small combustor volume. It is nonetheless possible to have the tangential components of nozzle air inlets and dilution air inlets being in the same direction, or without tangential components.

Referring to FIG. 4, a plurality of cooling air inlets 27 may be defined in the inner liner 20 and outer liner 30 (although not shown). The outer liner 30 has a set of dilution air inlets 37 in an alternating sequence with the set of dilution air inlets 36. The dilution air inlets 37 have a smaller diameter than that of the dilution air inlets 36. This alternating sequence is a configuration considered to maximize the volume of dilution in a single circumferential band, while providing suitable structural integrity to the outer liner 30.

Referring to FIGS. 2 to 4, the manifold 40 is schematically shown as having fuel injector sites 41 facing downstream on an annular support 42. The annular support 42 may be in the form of a full ring, or a segmented ring. The fuel injector sites 41 are circumferentially distributed in the annular support 42, and each accommodate a fuel nozzle (not shown). It is considered to use flat spray nozzles to reduce the number of fuel injector sites 41 yet have a similar spray coverage angle. As shown in FIGS. 3 and 4, the number of nozzle air inlets (e.g., 22, 23, 32, and 33) is substantially greater than the number of fuel injector sites 41, and thus of fuel nozzles of the manifold 40. Moreover, the continuous circumferential distribution of the nozzle air inlets relative to the discrete fuel nozzles creates a relative uniform air flow throughout the upstream zone A in which the fuel stream is injected.

A liner interface comprising a ring 43 and locating pins 44 or the like support means may be used as an interface between the support walls 21 and 31 of the inner liner 20 and outer liner 30, respectively, and the annular support 42 of the manifold 40. Hence, as the manifold 40 is connected to the combustor 16 and is inside the combustor 16, there is no relative axial displacement between the combustor 16 and the manifold 40.

As opposed to manifolds located outside of the gas generator case, and outside of the combustor, the arrangement shown in FIGS. 2-4 of the manifold 40 located inside the combustor 16 does not require a gas shielding envelope, as the liners 20 and 30 act as heat shields. The manifold 40 is substantially concealed from the hot air circulating outside the combustor 16, as the connection of the manifold 40 with an exterior of the combustor 16 may be limited to a fuel supply connector projecting out of the combustor 16. Moreover, in case of manifold leakage, the fuel/flame is contained inside the combustor 16, as opposed to being in the gas generator case. Also, the positioning of the manifold 40 inside the combustor 16 may result in the absence of a combustor dome, and hence of cooling schemes or heat shields.

Referring to FIGS. 2 and 4, mixing walls 50 and 60 are respectively located in the inner liner 20 and outer liner 30, against the shoulders B2 upstream of the narrowing portion B1 of the mixing zone B, to define a straight mixing channel. The mixing walls 50 and 60 form a louver. Hence, the mixing walls 50 and 60 concurrently define a mixing channel of annular geometry in which the fuel and nozzle air will mix. The mixing walls 50 and 60 are straight wall sections 51 and 61 respectively, which straight wall sections 51 and 61 are parallel to one another in a longitudinal plane of the combustor 16 (i.e., a plane of the page showing FIG. 2). The straight wall sections 51 and 61 may also be parallel to the longitudinal axis X of the combustor 16. Other geometries are considered, such as quasi-straight walls, a diverging or converging relation between wall sections 51 and 61, among other possibilities. For instance, a diverging relation between wall sections 51 and 61 may increase the tangential velocity of the fluid flow. It is observed that the length of the straight wall sections 51 and 61 (along longitudinal axis X in the illustrated embodiment) is several times greater than the height of the channel formed thereby, i.e., spacing between the straight wall sections 51 and 61 in a radial direction in the illustrated embodiment. Moreover, the height of the channel is substantially smaller than a height of the combustion zone downstream of the dilution zone C. According to an embodiment, the ratio of length to height is between 2:1 and 4:1, inclusively, although the ratio may be outside of this range in some configurations. The presence of narrowing portion B1 upstream of the mixing channel may cause a relatively high flow velocity inside the mixing channel. This may for instance reduce the flashback in case of auto-ignition during starting and transient flow conditions. The configuration of the mixing zone B is suited for high air flow pressure drop, high air mass flow rate and introduction of high tangential momentum, which may contribute to reaching a high air flow velocity.

The mixing walls 50 and 60 respectively have lips 52 and 62 by which the mixing annular chamber flares into dilution zone C of the combustor 16. Moreover, the lips 52 and 62 may direct a flow of cooling air from the cooling air inlets 25, 25', 35, 35' along the flaring wall portions of the inner liner 20 and outer liner 30 in dilution zone C.

Hence, the method of mixing fuel and nozzle air is performed by injecting fuel in a fuel direction having axial and/or tangential components, relative to the central axis X of the combustor 16. Simultaneously, nozzle air is injected from an exterior of the combustor 16 through the holes 32, 33 made in the outer liner 30 into a fuel flow. The holes 32, 33 are oriented such that nozzle air has at least a tangential component NZ relative to the central axis X of the combustor 16. Nozzle air is injected from an exterior of the combustor 16 through holes 22, 23 made in the inner liner 20 into the fuel flow. The holes 22, 23 are oriented such that nozzle air has at least the tangential component NZ relative to the central axis X, with the tangential components NZ of the nozzle air of the inner liner 20 and outer liner 30 being in a same direction. Dilution air may be injected with a tangential component DZ in an opposite direction. The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A combustor for use in an aircraft gas turbine engine, the combustor comprising:
   an annular fuel manifold, the annular fuel manifold including an annular support, the annular support having fuel injector sites circumferentially distributed in the annular support, the annular support directly connected to a liner interface that supports the annular support relative to a rest of the combustor when the combustor is assembled, and
   an annular combustor chamber, the combustor chamber being formed between an inner liner and an outer liner, the outer liner being spaced apart from the inner liner, the combustor chamber having an upstream zone that houses an entirety of the annular support of the fuel manifold, and
   the upstream zone being formed at least in part by a portion of the outer liner that extends radially over a majority of the annular support of the fuel manifold
   wherein the inner liner and the outer liner extend around the fuel manifold and contact each other upstream of the fuel manifold to shield the fuel manifold from air circulating outside the combustor chamber.

2. The combustor according to claim 1, wherein the inner liner extends upstream of the fuel manifold and connects to the outer liner to form the upstream zone of the combustor chamber.

3. The combustor according to claim 1, wherein the inner liner and the outer liner define a heat shield that shields the fuel manifold from air circulating outside the combustor chamber.

4. The combustor according to claim 1, further comprising the liner interface, the liner interface being connected to the annular support of the fuel manifold and to at least one of the inner liner and the outer liner, and wherein the liner interface includes a plurality of radial pins extending through the outer liner into upstream zone of the combustor chamber, the radial pins being connected to the annular support of the fuel manifold via a ring.

5. The combustor according to claim 1, wherein the annular support is in a form of a full ring.

6. The combustor according to claim 1, wherein the annular support is in a form of a segmented ring.

7. The combustor according to claim 1, further comprising air inlets defined through the inner liner and air inlets defined through the outer liner.

8. The combustor according to claim 1, wherein the portion of the outer liner extends radially over an entirety of the fuel manifold.

9. The combustor according to claim 1, wherein the fuel manifold has a circumference, a width, and a length in an axial direction of the annular combustor chamber, and the portion of the outer liner extends over an entirety of the length of the fuel manifold.

10. A gas turbine engine comprising the combustor according to claim 1.

11. A combustor for use in an aircraft gas turbine engine, the combustor comprising
   an annular fuel manifold, the annular fuel manifold including an annular support having fuel injector sites circumferentially distributed in the annular support, the annular support being configured to connect to a liner interface that supports the annular support relative to a rest of the combustor when the combustor is assembled, and an annular combustor chamber, the combustor chamber being formed between an inner liner and an outer liner, the outer liner being spaced apart from the inner liner, the combustor chamber housing the annular support of the fuel manifold, and the inner liner and the outer liner contacting each other and defining a heat shield for shielding the fuel manifold from air circulating outside the combustor.

12. The combustor according to claim 11, wherein the inner liner and the outer liner define at least part of the heat shield.

13. The combustor according to claim 11, wherein the combustor includes an upstream zone, an entirety of the annular support of the fuel manifold is disposed in the upstream zone, and the heat shield is at the upstream zone.

14. A gas turbine engine comprising the combustor according to claim 11.

15. A combustor for use in an aircraft gas turbine engine, the combustor comprising an annular fuel manifold, the annular fuel manifold including an annular support, the annular support having fuel injector sites circumferentially distributed in the annular support, the annular support being configured to connect to a liner interface that supports the annular support relative to a rest of the combustor when the combustor is assembled, and an annular combustor chamber, the combustor chamber being formed between annular walls of an inner liner and an outer liner, the outer liner being spaced apart from the inner liner, the annular fuel manifold being inside the annular combustor chamber, wherein the annular walls of both the inner liner and the outer liner extend around the annular support of the fuel manifold and are directly interconnected at a location that is upstream of the fuel manifold.

16. The combustor according to claim 15, wherein the inner liner and the outer liner are configured to shield the fuel manifold from air circulating outside the combustor chamber.

17. The combustor according to claim 15, wherein the inner liner and the outer liner define a heat shield that shields the fuel manifold from air circulating outside the combustor chamber.

18. The combustor according to claim 15, further comprising the liner interface, the liner interface including a plurality of radial pins extending from outside of the combustor chamber into the combustor chamber through the outer liner, each of the radial pins being connected to the annular support of the fuel manifold and to at least one of the inner liner and the outer liner.

* * * * *